United States Patent
Haustein et al.

(10) Patent No.: US 8,037,332 B2
(45) Date of Patent: Oct. 11, 2011

(54) QUAD-STATE POWER-SAVING VIRTUAL STORAGE CONTROLLER

(75) Inventors: Nils Haustein, Soergenloch (DE); Craig Anthony Klein, Tucson, AZ (US); Ulf Troppens, Mainz (DE); Daniel James Winarski, Tucson, AZ (US); Rainer Wolafka, Bad Soden (DE)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 12/112,860

(22) Filed: Apr. 30, 2008

(65) Prior Publication Data
US 2009/0276648 A1 Nov. 5, 2009

(51) Int. Cl.
G06F 1/32 (2006.01)
G06F 1/00 (2006.01)
G06F 12/00 (2006.01)

(52) U.S. Cl. ............... 713/320; 713/300; 711/114
(58) Field of Classification Search .......... 713/320
See application file for complete search history.

(56) References Cited

U.S. PATENT DOCUMENTS

| | | | |
|---|---|---|---|
| 5,682,273 | A | 10/1997 | Hetzler |
| 5,872,669 | A | 2/1999 | Morehouse et al. |
| 6,868,501 | B2 | 3/2005 | Saitou et al. |
| 7,554,758 | B2 * | 6/2009 | Hakamata et al. ............. 360/69 |
| 7,840,820 | B2 * | 11/2010 | Shimada ................... 713/300 |
| 2005/0210304 | A1 * | 9/2005 | Hartung et al. ............. 713/320 |
| 2006/0193073 | A1 | 8/2006 | Hakamata et al. |
| 2007/0073970 | A1 | 3/2007 | Yamazaki et al. |
| 2007/0143542 | A1 | 6/2007 | Watanabe et al. |

* cited by examiner

*Primary Examiner* — Suresh K Suryawanshi
(74) *Attorney, Agent, or Firm* — Griffiths & Seaton PLLC (57) ABSTRACT

A method, system and computer program product for reducing the collective power consumption of a plurality of storage devices including a plurality of associated storage volumes is provided. The storage volumes are grouped by a last access time according to a plurality of ranks. The plurality of ranks corresponds to a level of power consumption based on device activity. A volume of the plurality of storage volumes is moved between the plurality of ranks according to an access pattern of the volume.

22 Claims, 8 Drawing Sheets

FIG. 1

| RANK | RANK STATE | PHYSICAL VOLUMES | LOGICAL VOLUMES | STRIPES | LAST ACCESSED TIMESTAMP |
|---|---|---|---|---|---|
| RANK 1 | NORMAL | 1,2,3,4 | 01A4 | 000002-001342 | 0000045364784720 |
|  |  |  | 002A | 001343-004322 | 00000087B5D38376D |
|  |  |  | 0005 | 2A0121-4B321B | 000000064600098D |
|  |  |  | 0213 | 004323-01B231 | 000000000012857BD |
|  |  |  | 000C | 01C111-0D1291 | 00000013BED1A125 |
| RANK 2 | REBUILD | 13,14,15,16 | 002B | 001245-434322 | 00000002A6453647 |
| RANK 3 | UNLOADED | 29,30,31,32 | 000A | 2A0121-4B321B | 000000216098098 |
|  |  |  | 9990 | 000002-001342 | 000000D435267B12 |
|  |  |  | 7833 | 001234-103212 | 000000DCB765423 |
|  |  |  | 0123 | FEB121-FFE012 | 0000000006537B9D8 |
|  |  |  | 0912 | 10211C-11D232 | 00000007685847DC |
|  |  |  | 0473 | 201222-321122 | 00000367BEF37652 |
| RANK 4 | FREE | 5,6,7,8 |  |  |  |
| RANK 5 | LOW_RPM | 41,42,43,44 | 0FFE | 000001-120001 | 00000016453BDE |
| RANK 6 | NORMAL | 33,34,35,36 | 1F0B | 991928-BE1201 | 000001289BCD98E |
|  |  |  | 0023 | 134250-690012 | 0000000645362 6C |
|  |  |  | 0AAA | 690013-991927 | 00000BE7810BED0 |
| RANK 7 | MAINTENANCE | 17,18,19,20 |  |  |  |
| RANK 8 | DEGRADED | 9,10,11,12 |  |  |  |
| RANK 9 | LOW_RPM | 25,26,27,28 | 6354 | 099000-14567D | 00000989QBBFE782 |
| ...... | ...... | ...... |  |  |  |
| RANK N |  | WW,XX,YY,ZZ |  |  |  |

QUAD-STATE POWER-SAVING VIRTUAL STORAGE CONTROLLER

BACKGROUND OF THE INVENTION

1. Field of the Invention

The present invention relates in general to computers, and more particularly to a method, system, and computer program product for reducing the collective power consumption of a plurality of storage devices including a plurality of associated storage volumes in a computing environment.

2. Description of the Related Art

Computers, and accompanying data storage, are commonplace in today's society. Individuals, businesses, organizations, and the like have a need for a certain amount of data storage. Historically, data has been stored on local storage devices, such as tape drives, hard disk drives (HDDs), and removable media such as compact discs (CDs) and digital versatile discs (DVDs). As more of society becomes digital, the need for data storage has generally increased. As the need for data storage and data redundancy has proliferated, storage devices have been implemented in various sites. In some cases, the data storage is maintained in multiple storage servers as part of multiple data storage subsystems.

In the 21st century, applications for HDDs have expanded to include digital video recorders, digital audio players, personal digital assistants, digital cameras and video game consoles. The need for large-scale, reliable storage, independent of a particular device, led to the introduction of configurations such as redundant array of independent disks (RAID) arrays, network attached storage (NAS) systems and storage area network (SAN) systems that provide efficient and reliable access to large volumes of data.

SUMMARY OF THE INVENTION

Hard disk drive (HDD) manufacturers have recently introduced power-saving features in disk drives that allow for several levels of power savings, including disabling the servo, lowering the spin rate of the platter, unloading the read-write head and powering off the disk electronics. To take advantage of these features in a large-scale disk array, it would be beneficial to have a method of managing data stored on such drives such that a subsystem can have a multi-tiered approach to balancing performance against power savings.

A volume is a storage container that may be represented as a device address to a host system. Each volume may comprise a plurality of disks with a certain storage capacity. Disks may be grouped in ranks, and hence each volume may be associated with one rank. This allows the grouping of volumes with similar access patterns on one or more ranks.

In light of the foregoing, in one embodiment, by way of example only, a method for reducing the collective power consumption of a plurality of storage devices including a plurality of associated storage volumes is provided. The storage volumes are grouped by a last access time according to a plurality of ranks, the plurality of ranks corresponding to a level of power consumption based on device activity. A volume of the plurality of storage volumes is moved between the plurality of ranks according to an access pattern of the volume.

In an additional embodiment, again by way of example only, a system for reducing the collective power consumption of a plurality of storage devices including a plurality of associated storage volumes is provided. A controller is in communication with the plurality of storage volumes. The controller is adapted for grouping the storage volumes by a last access time according to a plurality of ranks, the plurality of ranks corresponding to a level of power consumption based on device activity, and moving a volume of the plurality of storage volumes between the plurality of ranks according to an access pattern of the volume.

In still another embodiment, again by way of example only, a computer program product for reducing the collective power consumption of a plurality of storage devices including a plurality of associated storage volumes is provided. The computer program product comprises a computer-readable storage medium having computer-readable program code portions stored therein. The computer-readable program code portions comprise a first executable portion for grouping the storage volumes by a last access time according to a plurality of ranks, the plurality of ranks corresponding to a level of power consumption based on device activity, and a second executable portion for moving a volume of the plurality of storage volumes between the plurality of ranks according to an access pattern of the volume.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for reducing the collective power consumption of a number of storage devices in a computing environment including a number of associated volumes. These mechanisms may group volumes by a last-access time on a number of ranks. Accordingly, ranks of disk drives, containing volumes of the same group, may be set into power saving modes based upon the time since the data was last accessed on a particular volume.

For example, in one embodiment, when a volume is accessed, it is moved to an active rank. If a volume is not accessed for a first time interval, it is moved to a rank that is unloaded (servo unpowered). If the volume has not been accessed for a second time interval, it is moved to a rank that is slowed. If the volume is not accessed for a third interval time, the volume is moved to a rank that is in standby mode. Volumes within like-powered ranks are consolidated when possible to free ranks.

Thus, the mechanisms of the present invention introduce a tiered storage concept where power saving is the objective. There may be different tiers represented by ranks of different power states. Volumes may be automatically moved between ranks based on their access pattern.

Figure 1:
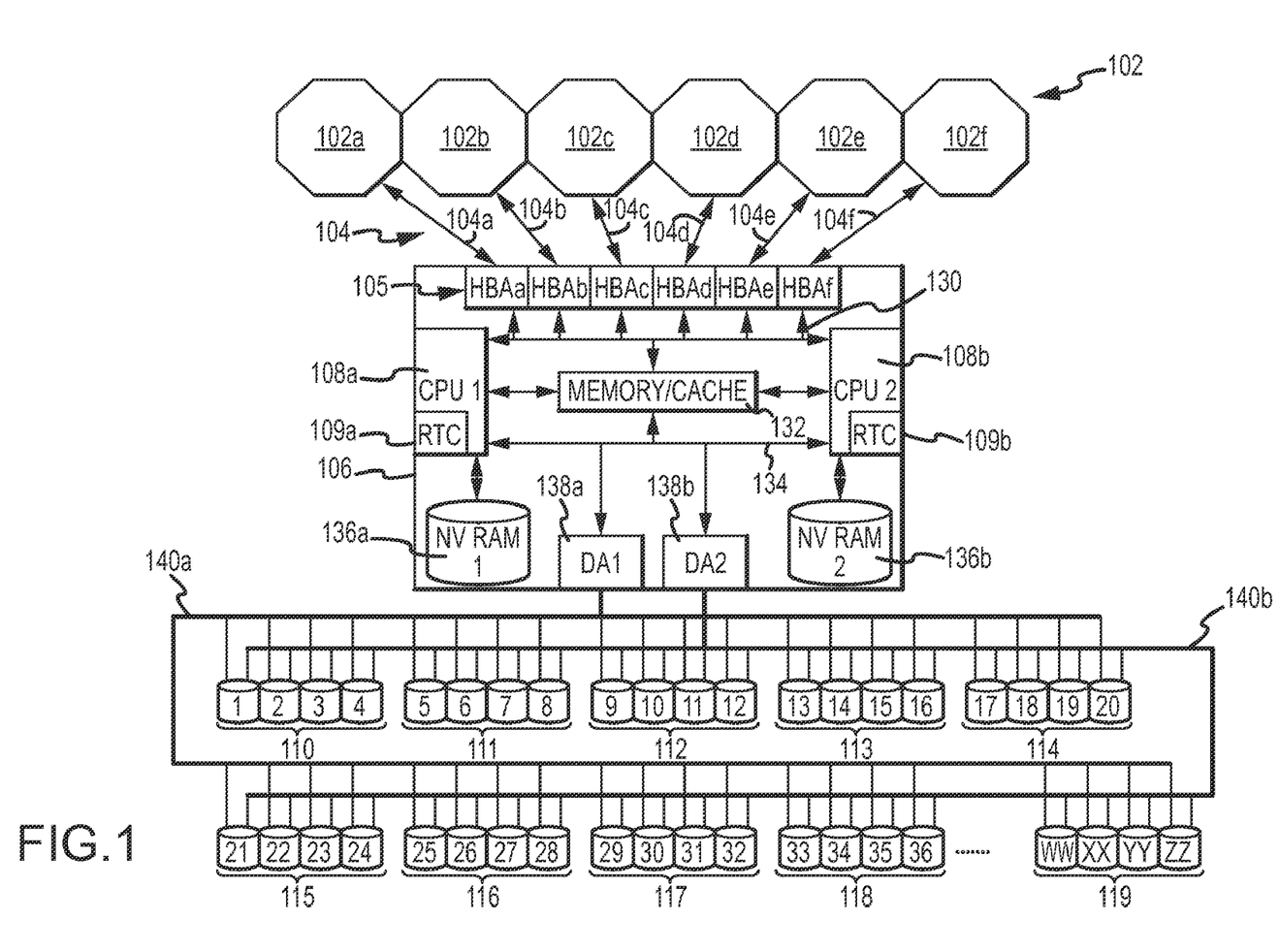
FIG. 1 depicts an exemplary computing storage system.

FIG. 1 hereafter provides one example of a data storage system architecture in which the mechanisms of the illustrative embodiments may be implemented. It should be appreciated, however, that FIG. 1 is only exemplary and is not intended to state or imply any limitation as to the particular architectures in which the exemplary aspects of the illustrative embodiments may be implemented. Many modifications to the architecture depicted in FIG. 1 may be made without departing from the scope and spirit of the following description and claimed subject matter.

FIG. 1 illustrates an exemplary storage system. Storage controller 106 is connected to hosts 102 via I/O interfaces 104, which can be Fibre Channel, SCSI, SAS, SATA, Ethernet, Fibre Channel over Ethernet, Infiniband, or any other storage interface known in the art. Storage controller 106 consists of six host bus adapters (HBA) 105, connecting the controller 106 to the input/output (I/O) interfaces 104, two central processing units (CPUs) 108, a memory/cache 132, two nonvolatile storage random access memories (NVRAM) 136, and two device adapters (DAs) 138. Each CPU 108 has a real time clock (RTC) 109a and b, which provide accurate time. The CPUs 108a and 108b communicate with the HBAs 105 and memory/cache 132 via host I/O bus 130. CPUs 108a and 108b communicate with DAs 138a and 138b via array I/O bus 134. The storage controller 106 is connected to disk drive ranks 110-119 via two separate interfaces, array busses 140. These busses 140 can be Fibre Channel, SCSI, SAS, SATA, Ethernet, Fibre Channel over Ethernet, Infiniband, or any other storage interface known in the art. In this exemplary storage system the disk drives are shown in ranks of 3+1 RAID 5 (effectively 3 data drives and 1 parity drive), but said disk drives can be in any number or combination of disks per rank. Likewise, storage system 106 may have more or less processors, HBAs, DAs, NVRAMs, etc.

Disk storage ranks 110 through 119 can each be in any one of several states or modes; Normal, Rebuilding, Degraded, Unloaded, Low_RPM, Standby, and Maintenance (although other similar classification names and types may be substituted and are contemplated, as the skilled artisan will appreciate). Their status is maintained by controller 106 via a table stored in NVRAM 136.

Figure 2:
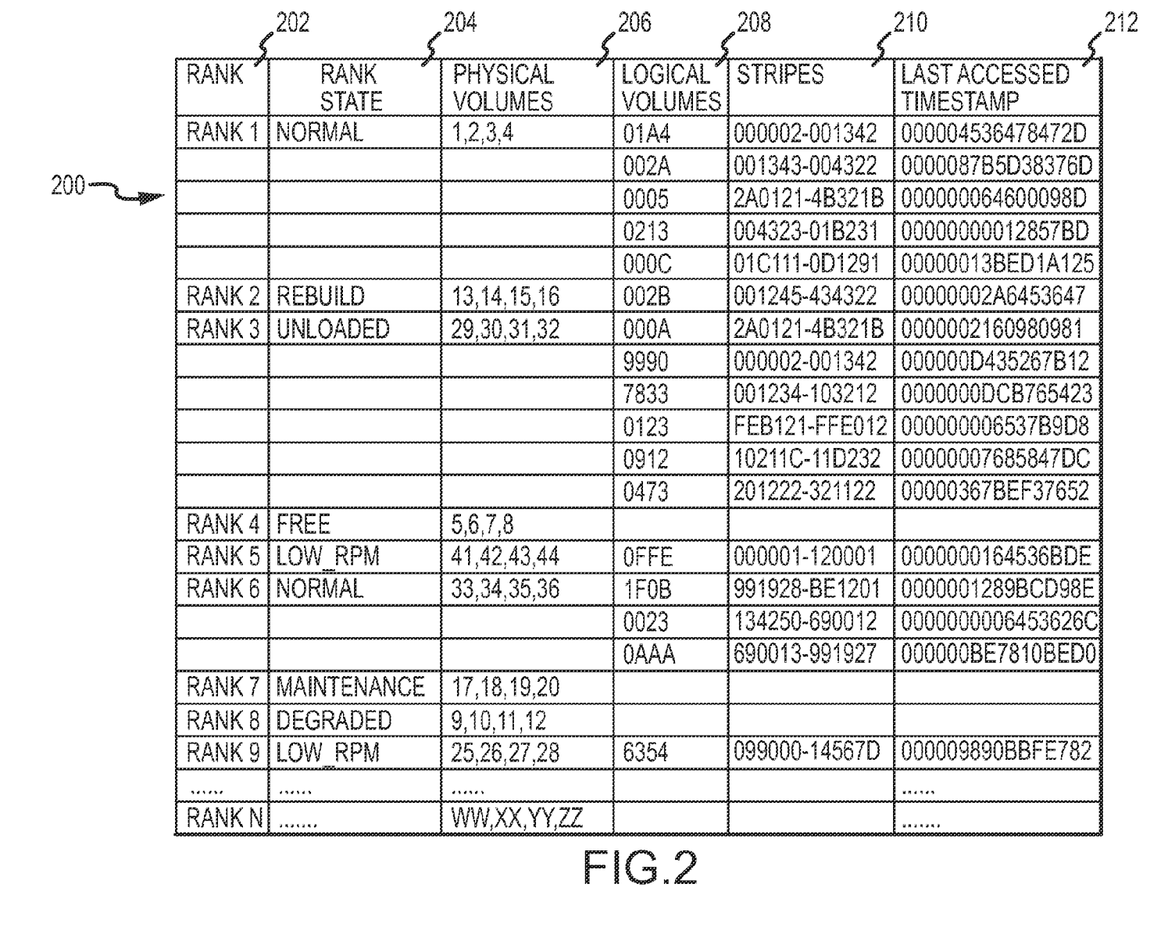
FIG. 2 depicts an exemplary table.

An exemplary table is shown in FIG. 2. Column 202 has the rank label which represents a unique name or identifier for each rank, column 204 has the power state of the associated rank, column 206 lists the physical drives which make up the rank, column 208 lists the logical volumes which reside on the rank as defined by the host systems, column 210 list the range of stripes on the physical volumes (drives) where the logical volumes reside, and column 212 has the time_stamp that the volume was last accessed by any of the hosts 102.

FIGS. 3-8, following, illustrate exemplary methods for reducing collective power consumption. As one skilled in the art will appreciate, various steps in these methods may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Figure 3:
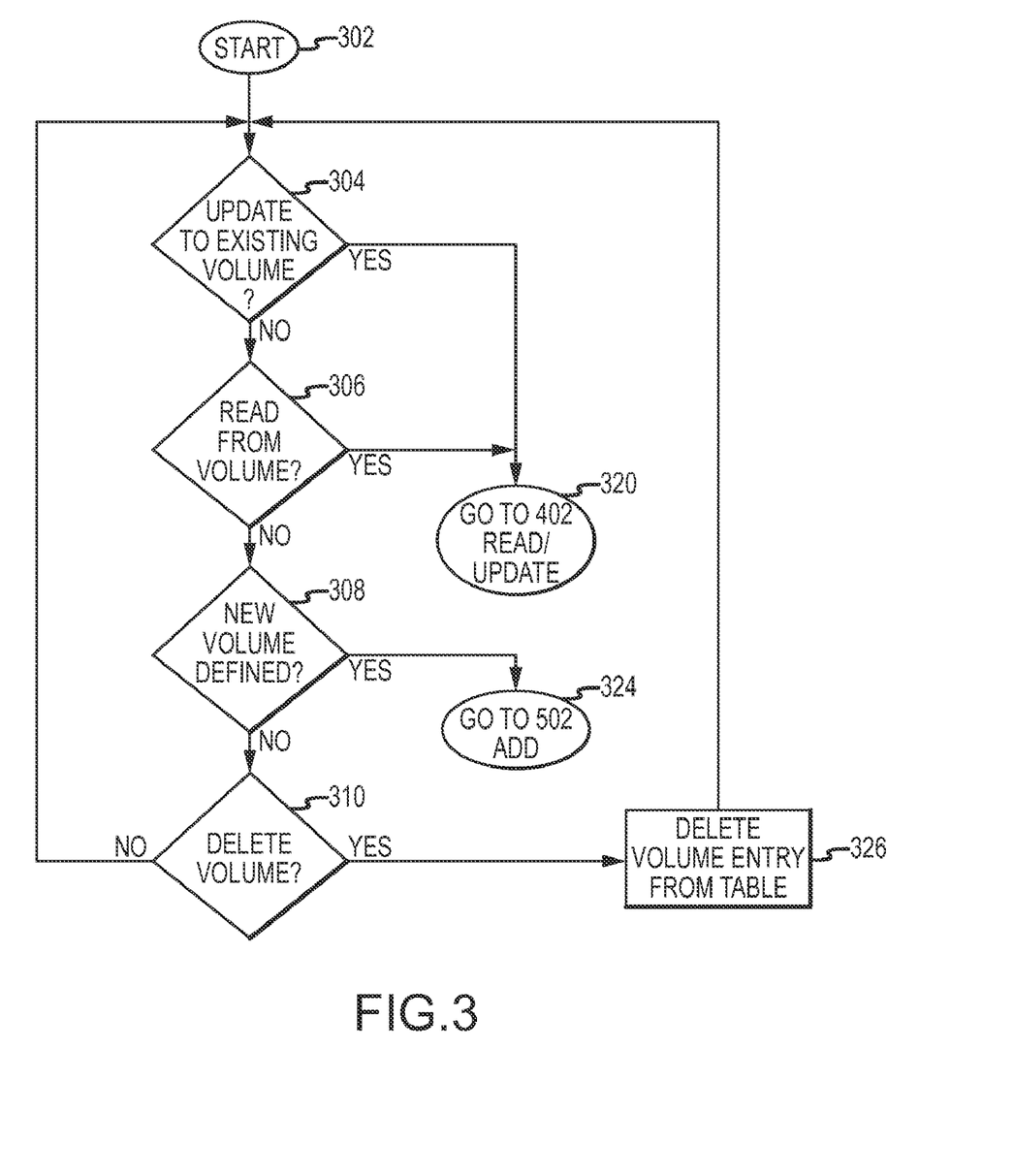
FIG. 3 depicts a first exemplary method for reducing power consumption.
Figure 4:
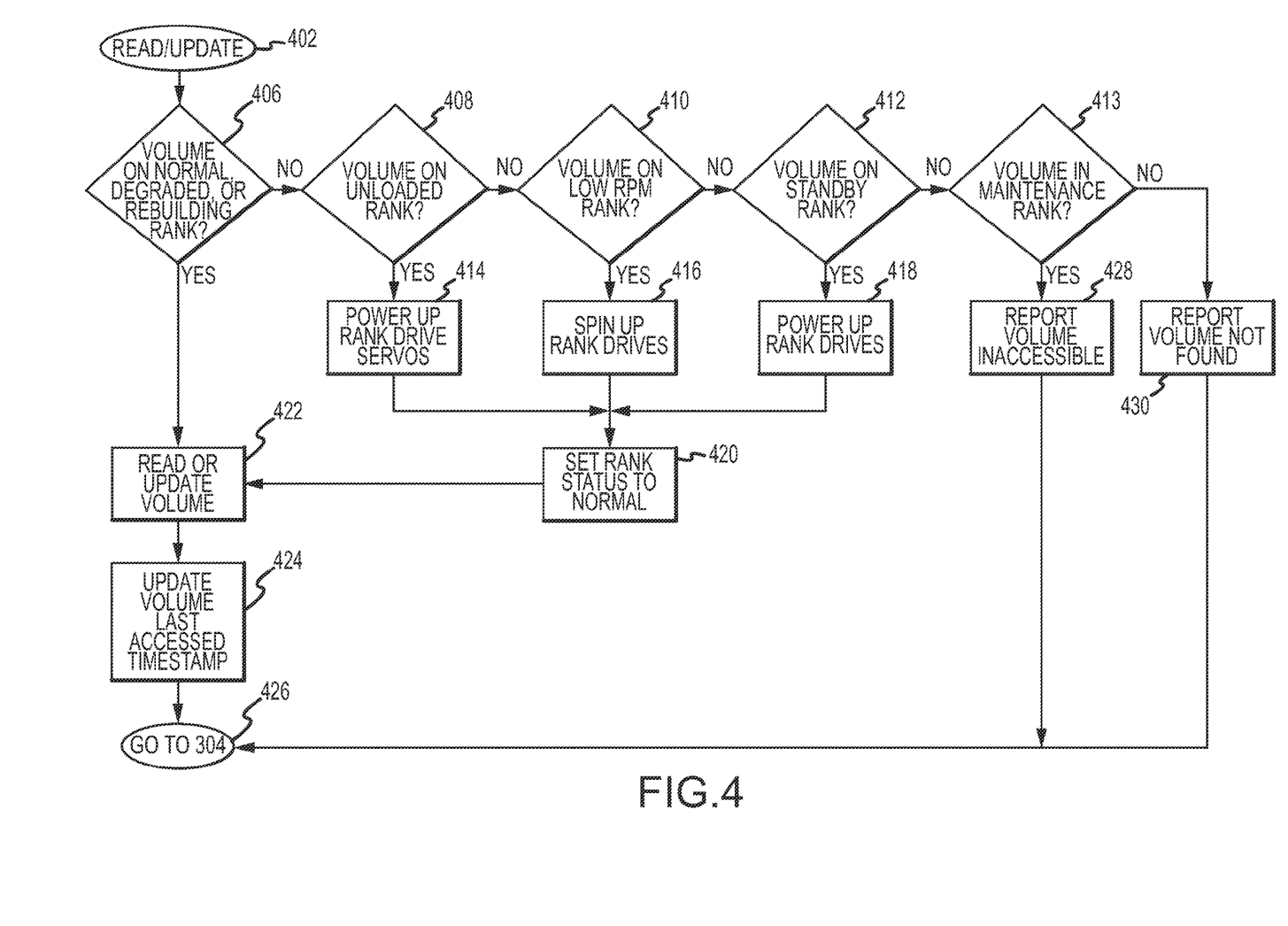
FIG. 4 depicts a second exemplary method for reducing power consumption.
Figure 5:
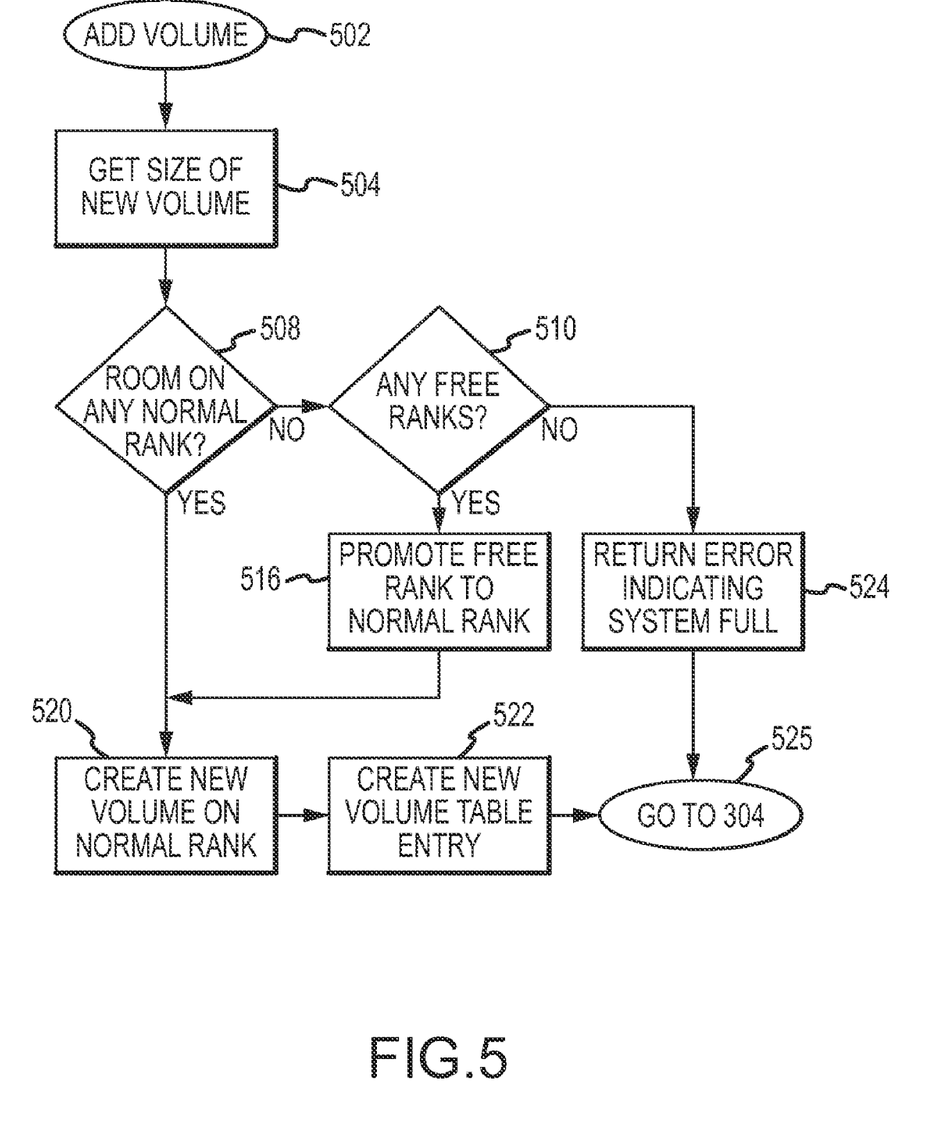
FIG. 5 depicts a third exemplary method for reducing power consumption.

FIGS. 3-8 illustrate exemplary processes by which the table shown in FIG. 2 is maintained and the power states of the ranks are controlled. In FIG. 3, the main process starts at 302 and flows to 304, where it checks for I/O commands. If in step 304 a write command is issued to an existing volume (yes), the process flows to step 320, where it jumps to step 402, Read/Update, shown in FIG. 4. If in step 304 there is no write command to an existing volume (no), then the process flows to step 306, where it checks for a read command. If a read command is detected (yes), then the process again flows to step 320. If in step 306, no read command is detected (no), the process flows to step 308, where it checks whether a new volume is being defined. If a new volume is being defined (yes), then the process flows to 324, where it jumps to step 502, Add, as shown in FIG. 5. If no new volume is being defined in step 308 (no), then the process flows to step 310, where it checks whether a volume is being deleted. If a volume is being deleted (yes), the process moves to step 326, where the volume entry is removed from the table shown in FIG. 2. The process then returns to step 304. If in step 310, there is no volume to be deleted (no), then the process returns to step 304.

FIG. 4 teaches the continuation of the Read/Update process. Beginning at step 402, the process flows to step 406, where the state of the rank containing the volume to be read or updated is determined. If the volume is on a rank that is in normal mode, degraded mode, or rebuild mode (yes), the process continues to step 422, where the volume is read or written as known in the art. The process then continues to step 424, where the volume table column 212 (FIG. 2) is updated with the last accessed time_stamp in the row corresponding to said accessed volume, obtained from the RTC 109. The process then continues to step 426, where it returns to step 304 (FIG. 3). If in step 406 it is determined that the requested volume is not on a normal rank, a degraded rank, nor a rebuilding rank (no), the process flows to step 408, where it checks if the volume is located on an unloaded rank. If the requested volume resides on an unloaded rank (yes), the process flows to step 414, where the servos for the physical drives within the rank are powered up. The process moves to step 420, and the rank state is changed in column 212 to normal as demonstrated in FIG. 2.

The process continues in step 422, and the volume is read or written as previously described. If in step 408 it is determined that the requested volume is not on an unloaded rank (no), then the process continues to step 410, where it checks whether the volume is on a rank that is in the Low RPM state. If the volume is located on a rank that is in the Low RPM state (yes), then the drives within the rank are spun up to normal speed for read/write access, step 416. In step 420 the rank status is set to normal as previously described and the process continues. If in step 410 it is determined that the volume requested does not reside on a volume that is in the Low RPM state (no), then the process moves to step 412, where the process checks whether then volume exists on a rank that is in the Standby state. If the requested volume exists on a rank that is in the standby state (yes), then the process moves to step 418, where the drives in the rank are powered up. The process then moves to step 420 and continues as previously described.

If in step 412 it is determined that the volume does not exist on a rank that is in the standby state (no), then the process continues to step 413, where it checks if the volume exists on a rank that is in maintenance mode. If the volume is located on a rank that is maintenance mode (yes), then the process continues to step 428, where it is reported that the volume is inaccessible, and the process moves to step 426 where it returns to step 304 (FIG. 3). If in step 413 it is determined that the volume is not in maintenance mode (no), then the process continues to step 430, where it reports the volume not found. The process then flows to step 426, where it returns as previously described.

FIG. 5 continues the process for adding a volume to the storage system. Beginning at step 502, the process flows to step 504, where the size of the new volume is determined. In step 508, it checks whether the new volume will fit on any existing rank in normal state. If a rank in normal state is available that provides sufficient storage capacity for the new volume (yes), the process moves to step 520, where the new volume is created on said rank. The process continues to step 522, where a new volume table entry (column 208 in FIG. 2) is created for the volume under said rank (column 202 of FIG. 2) where the volume was created on. The process then flows to step 525, where it returns to step 304 on FIG. 3.

If in step 508 it is determined that there are no ranks in normal state that will hold the new volume (no), the process goes to step 510, where it checks if a rank in state Unloaded, Low_RPM, Standby, Rebuilding or Degraded provide sufficient capacity for said volume. Thereby the search order for ranks in maintained in the above sequence which ensures that ranks in state Rebuilding or Degraded are selected last. In an alternate embodiment the process only checks if ranks in state Unloaded, Low_RPM or Standby are checked in step 510. This eliminates the exposure that a new volume is created on a rank in state Rebuilding or Degraded until such a rank is back to another state. If the storage system has a such rank available (yes), the selected rank is powered up and promoted to a normal rank (step 516) and the process continues at step 520 as described previously. If in step 510 it is determined that there are no free ranks available (no), the process moves to step 524, where an error is returned to the request to create a new volume indicating that the system is full. The process then moves to step 525, where it returns to step 304 in FIG. 3.

Figure 6:
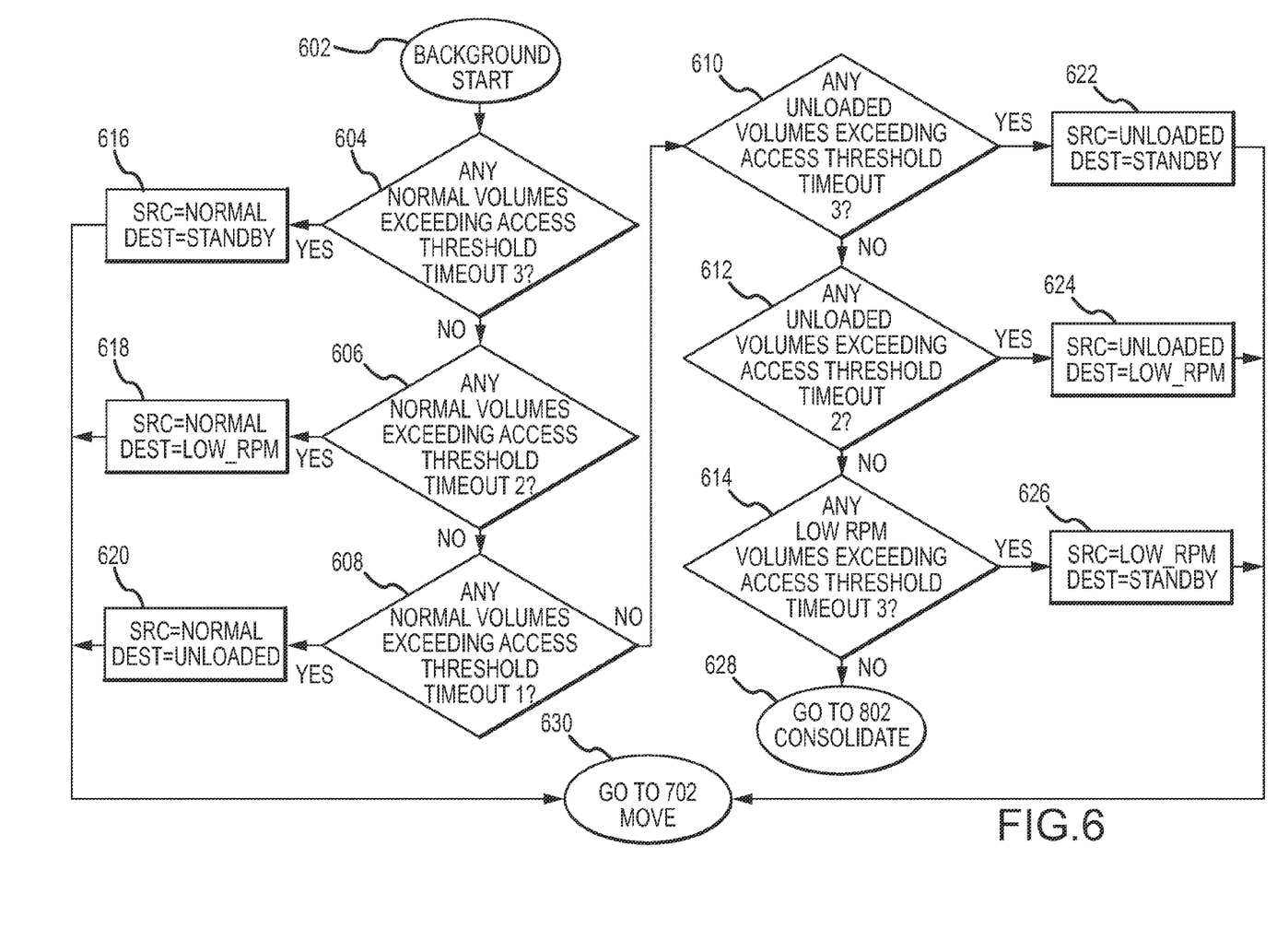
FIG. 6 depicts a fourth exemplary method for reducing power consumption.

FIG. 6 teaches an exemplary background process that can be either run repeatedly or initiated at a preset interval when most appropriate. By comparing the current time from the RTC 109 to the last accessed time_stamp in the table shown in FIG. 2, the process determines whether the time since the last access of a volume has exceeded three preset values, known here as threshold time-out 1, threshold time-out 2, and threshold time-out 3. Threshold time-out 1 will be less than threshold time-out 2, which in turn will be less than threshold time-out 3. These three time-out values either can be set arbitrarily or adjusted by the system administrator. Based upon the determination, the process will act accordingly as follows, any volume that has not been accessed since threshold time-out 3 will be moved to a standby rank. Volumes that have not been accessed since threshold time-out 2 shall be moved to a Low RPM rank, and any volumes that have not been accessed since threshold time-out 1 will be moved to an unloaded rank.

Starting at step 602, the process moves to step 604, where it reads the time_stamp of the last access (column 212 in FIG. 2) for each volume (column 208 in FIG. 2) from the table shown in FIG. 2. It checks whether any volumes that reside on a normal rank (a normal rank is equivalent to rank in normal state) have an access time_stamp indicating that the time since last accessed (elapsed time) has exceeded threshold time-out 3. If it has any such volumes (yes), the process moves to step 616, where it sets two system variables. The first variable, SRC, is used to store the state of the source rank, set to Normal in step 616, and the second variable is DEST, used to store the state of the destination rank, set to Standby in step 616. The process then continues to step 630, where it jumps to step 702 on FIG. 7. If in step 604 it is determined that no volumes on normal ranks have exceeded threshold time-out value 3 (no), the process moves to step 606, where it similarly checks to see if any volumes on normal ranks have exceeded threshold time-out 2 since last accessed, as read from the last accessed time_stamp in the table shown in FIG. 2. If a volume has exceeded the threshold time-out 2 (yes), the process flows to step 618, where SRC is set to Normal, and DEST is set to Low_RPM. The process then flows to step 630 as previously described.

If in step 606 it is determined that no volumes located on a normal rank have exceeded threshold time-out 2 (no), the process continues to step 608, where it checks whether any volumes existing on a normal rank have exceeded threshold time-out 1. If a volume that exists on a normal rank has exceeded threshold time-out 1 (yes), the process moves to step 620, where SRC is set to Normal and DEST is set to Unloaded. The process moves to step 630 as described before. If in step 608 no volumes existing on a normal rank have exceeded threshold time-out 1 (no), the process moves to step 610, where it checks whether any volumes existing on an unloaded rank have exceeded threshold time-out value 3. If a volume existing on an unloaded rank has exceeded threshold time-out 3 (yes), the process moves to step 622, where SRC is set to Unloaded and DEST is set to Standby. The process then continues to step 630 as described previously.

If in step 610 it is determined that no volumes existing on an unloaded rank have exceeded threshold time-out 3 (no), the process moves to step 612, where it checks for volumes existing on an unloaded rank that have exceeded threshold time-out 2. If a volume is found that exists on an unloaded rank and has exceeded threshold time-out 2 (yes), the process moves to step 624, where it sets SRC to Unloaded and DEST to Low_RPM. It then moves to step 630 as previously described. If in step 612 no volumes are detected that exist on an unloaded volume and has exceeded threshold time-out 2 (no), the process moves to step 614, where it checks for volumes on Low RPM ranks that have exceeded threshold time-out 3. If such a volume is found (yes), the process moves to step 626, where it sets SRC to Low_RPM, and DEST to Standby, and then moves to step 630 as described previously. If in step 614 no volumes existing on Low RPM ranks are found that exceed threshold time-out 3, the process moves to step 628, where it jumps to step 802 in FIG. 8, to be described below.

Figure 7:
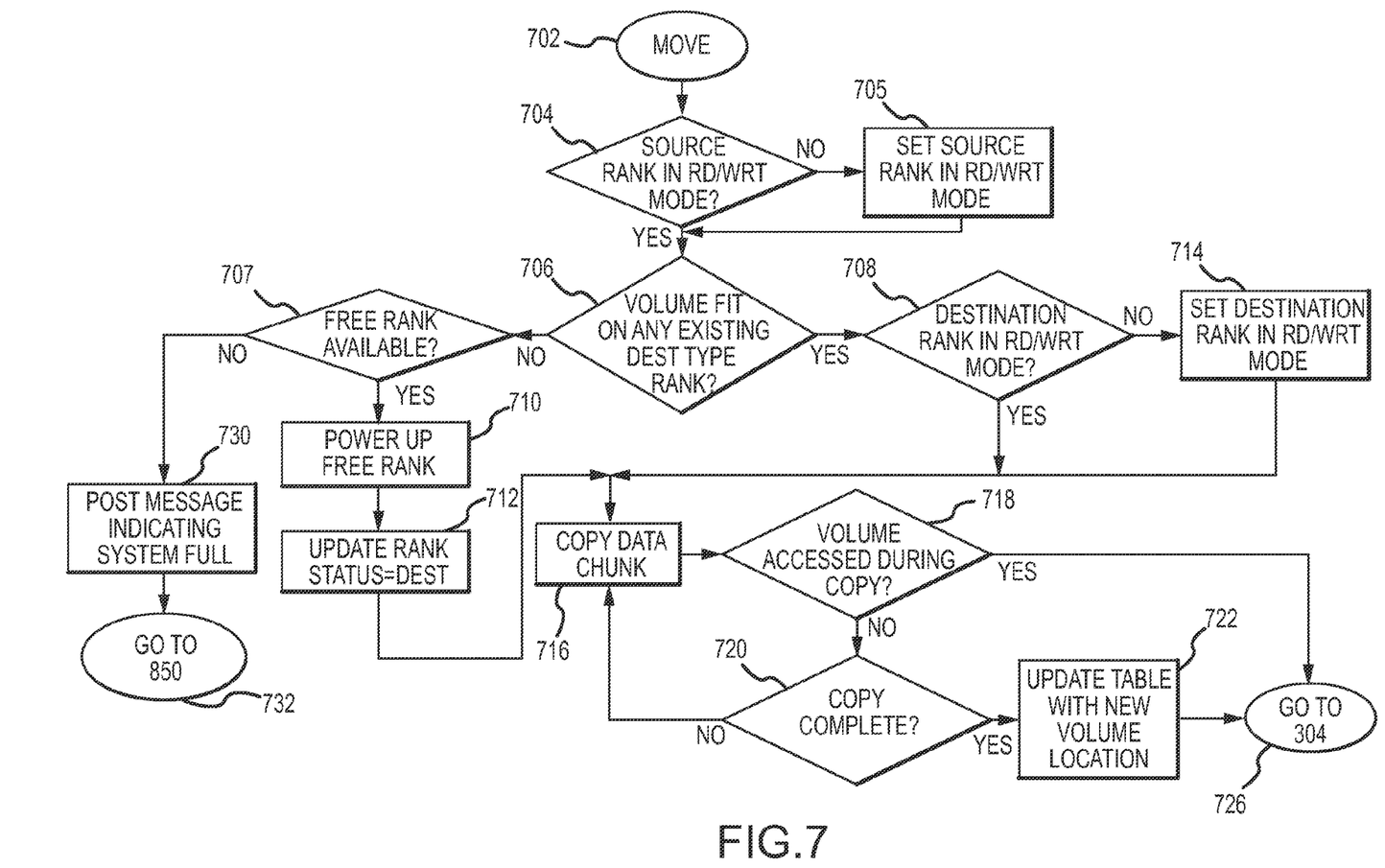
FIG. 7 depicts a fifth exemplary method for reducing power consumption.

FIG. 7 shows an exemplary process fragment that accomplishes the movement of volumes between ranks. The process continues at step 702, where it moves to step 704. The process then checks whether the source rank drives are in read/write mode by inspecting the variable SRC, saved previously. The read/write mode refers to the state of the drive comprised in a rank. This mode refers to the capability of drives to process read and write commands. If the source rank drives are not in read/write mode (no), the process flows to step 730, where the source rank drives are spun up if in standby or low rpm mode, and the servos are powered up. The process then moves to step 706. If in step 704 it is determined by inspecting the previously saved variable SRC that the source rank drives are in read/write mode already (yes), the process moves to step 706, where it determines the destination rank type by inspecting the previously saved variable DEST, and then checks whether the volume to be moved will fit on any existing ranks of the same type.

If there are no ranks of the destination type that have enough free space to hold the volume to be moved, the process flows to step 707, where it checks for available free ranks. If there are no available free ranks (no), the process moves to step 730, where a service informational message is posted indicating that the system is full. The process then flows to step 732, where it jumps to step 850 in FIG. 8, to be discussed later. If in step 707 it is determined that a free rank is available (yes), the process goes to step 710, where said free rank is powered up. In step 712, the free rank's status is updated in the rank table (FIG. 2) to match the rank status previously stored in the variable DEST. The process then moves to step 716 where a chunk of data consisting of one or more stripes is copied from the source rank to the destination rank.

The process then moves to step 718, where it checks by inspecting the last accessed time_stamp in the rank table (FIG. 2) whether the source volume has been accessed since the commencement of the copy operation. If the volume has been accessed since the copy began (yes), then the copy is terminated and the process flows to step 726, where it returns to step 304. If in step 718 the volume has not been accessed since the copy began, the process flows to step 720, where it checks whether the copy is complete. If the copy is not complete (no), the process returns to step 716 as discussed previously. If the copy is complete (yes), the rank table (FIG. 2) is updated reflecting the new volume location on the destination rank, step 722

The process then moves to step 726, where it returns to step 304. If in step 706 it is determined that a rank of DEST type exists that will hold the volume to be moved (yes), the process flows to step 708, where it checks whether the drives comprised in said rank are in read/write mode. If the destination rank is not in read/write mode (no), the process continues to step 714, where the drives pertaining to the destination rank are powered up if in low rpm or standby mode, and the servo is powered. The process then moves to step 716 as discussed previously. If in step 708 it is determined that the destination rank is in read/write mode (yes), the process moves to step 716 as previously discussed.

Figure 8:
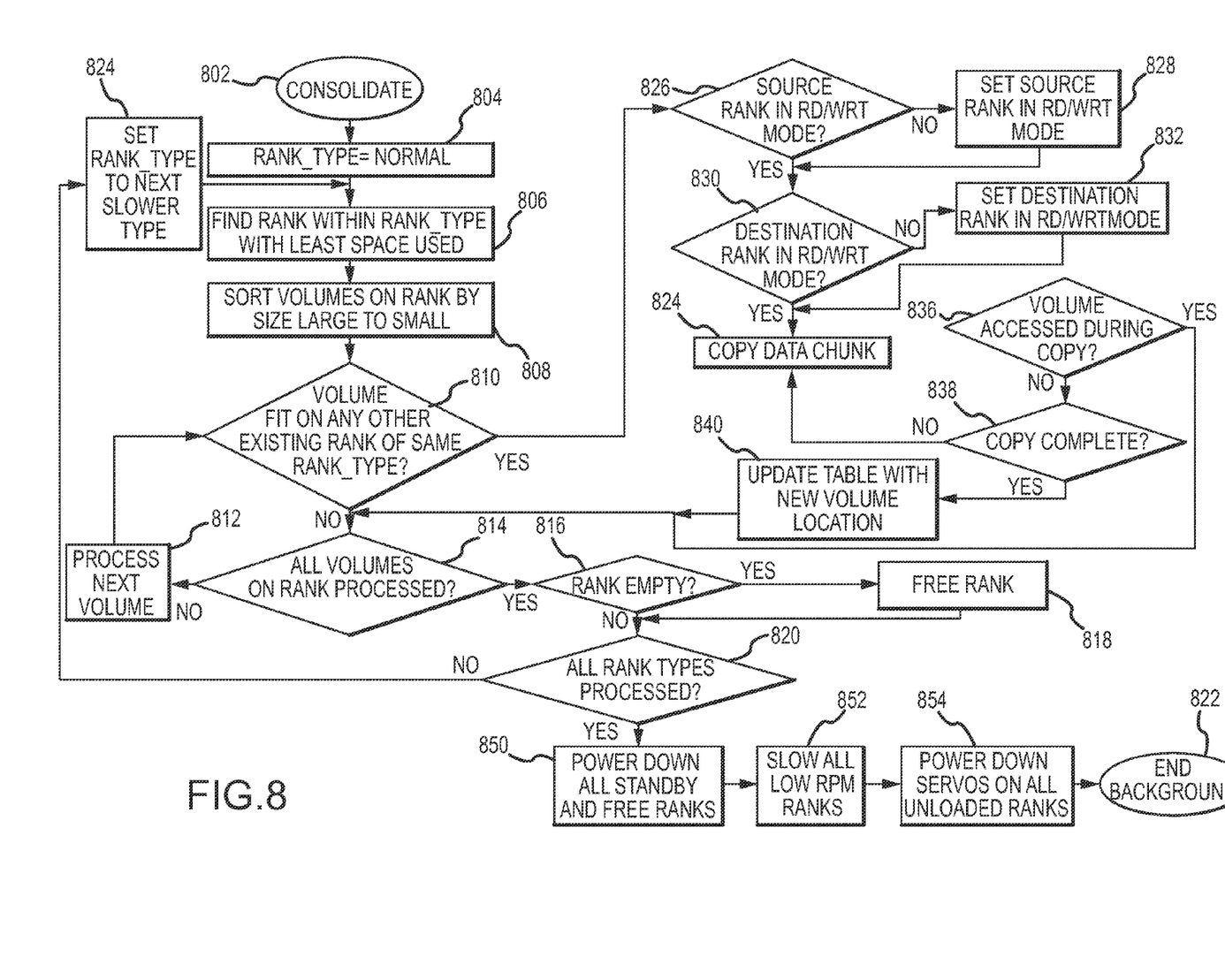
FIG. 8 depicts a sixth exemplary method for reducing power consumption.

FIG. 8 teaches an exemplary process fragment that performs the consolidation of like volumes. The process continues at step 802, and then flows to step 804, where the variable Rank_type is set to normal. The process then moves to step 806, where it determines which rank (column 202 of FIG. 2) within the rank state defined by variable Rank_type (column 204 of FIG. 2) has the least space used. The spaced used by a rank is determined by the storage controller 106. In step 808, the process then sorts the volumes located on said determined rank by size, largest to smallest. Then in step 810, the process checks whether the first volume on the sorted list, which will be the largest on the first pass, will fit on any other ranks of the same type as defined in Rank_type.

If the current volume will fit on another rank of the same type (yes), the process moves to step 826, where it checks whether the source rank drives are in read/write mode. The read/write mode refers to the state of the drive comprised in a rank. This mode refers to the capability of drives to process read and write commands. If the source rank drives are not in read/write mode (no), the process moves to step 828, where they are powered up if in standby mode, spun up if in low rpm mode, and the servos powered. The process then moves to step 830 to be described later. If in step 826 it is determined that the source rank drives are in read/write mode (yes), then the process moves to step 830. In step 830, the process checks whether the destination rank drives are in read/write mode. Read/write mode refers to the capability of drives to process read and write commands.

If the destination rank drives are not in read/write mode (no), the process moves to step 832, where they are powered up if in standby mode, spun up if in low rpm mode, and the servos powered. The process then moves to step 834 to be described later. If in step 830 it is determined that the destination rank drives are in read/write mode (yes), then the process moves to step 834. In step 834, one or more stripes of data are copied from the source drive to the destination drive. In step 836, the process checks whether the volume has been accessed during the copy process by looking at the last accessed time_stamp in the rank table (FIG. 2). If the volume has been accessed since beginning the copy, (yes), then the process moves to step 814 to be discussed later. If the volume has not been accessed since beginning the copy (no), the process continues at step 838, where it checks whether the copy is complete.

If the copy is not complete (no) in step 838, the process returns to step 834 to copy more stripes. If the copy is complete (yes), process flows to step 840, where the rank table (FIG. 2) is updated with the new volume location. The volume entry is deleted under the old rank, and is added under the new rank. The process then moves to step 814, where it checks if all of the volumes on the source rank have been processed. If not (no), then the process flows to 812, where the next volume on the size-sorted list is selected for processing. The process then continues at step 810 as previously described. If in step 814 it is determined that all volumes on the source rank have been processed (yes), the process moves to step 816, where it checks the rank table (FIG. 2) to see if the source rank is now empty. If the source rank is empty (yes), the process flows to step 818, where the rank is marked free on the rank table (FIG. 2). The process then flows to step 820 to be described later.

If in step 816 it is determined that the current source rank is not empty (no), the process moves to step 820, where it is checked whether all rank types have been processed. If further rank types need to be processed (no), the process moves to step 824, where it changes the variable Rank_type to the next slowest rank type. If the rank type just processed was normal, then it is changed to unloaded. If it was unloaded, the rank type is set to low rpm. If the rank type was low rpm, it is set to standby. If the rank type was standby, then all have been processed (maintenance, rebuild, and others are not processed). The process then continues at 806 as previously described. If in step 820 it is determined that all rank types have been processed (yes), the process moves to step 850, and all standby and drives in free ranks are powered down. Then, in step 852, all low rpm rank drives are slowed. The process continues at step 854, where all servos on drives in unloaded ranks are powered off. The process then ends at step 822.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for reducing the collective power consumption of a plurality of storage devices including a plurality of associated storage volumes, comprising:
grouping the storage volumes by a last access time according to a plurality of ranks, the plurality of ranks corresponding to a level of power consumption based on device activity, including one of a normal, rebuilding, degraded, unloaded, low revolutions-per-minute (RPM), standby, and maintenance rank; and
moving a volume of the plurality of storage volumes between the plurality of ranks according to an access pattern of the volume.

2. The method of claim 1, wherein moving a volume of the plurality of storage volumes between the plurality of ranks according to an access pattern of the volume includes:
  detecting one of a read command and an update command,
  determining if the volume is on one of the normal rank and the rebuilding rank,
  performing one of reading the volume and updating the volume, and
  updating a volume last accessed timestamp.

3. The method of claim 1, wherein moving a volume of the plurality of storage volumes between the plurality of ranks according to an access pattern of the volume includes:
  detecting one of a read command and an update command,
  determining if the volume is on the unloaded rank, wherein if the volume is on the unloaded rank, powering up at least one drive servo associated with the volume, and setting a to the normal rank,
  determining if the volume is on the low RPM rank, wherein if the volume is on the low RPM rank, spinning up at least one drive associated with the volume,
  determining if the volume is on the standby rank, wherein if the volume is on the standby rank, powering up the at least one drive associated with the volume,
  setting the rank to the normal rank,
  performing one of reading the volume and updating the volume, and
  updating a volume last accessed timestamp.

4. The method of claim 1, wherein moving a volume of the plurality of storage volumes between the plurality of ranks according to an access pattern of the volume includes:
  detecting one of a read command and an update command,
  determining if the volume is on the maintenance rank, wherein if the volume is on the maintenance rank, reporting the volume as inaccessible, and
  determining if the volume is not on one of the normal, rebuilding, unloaded, low RPM, standby, and maintenance ranks, wherein if the volume is not on one of the normal, rebuilding, unloaded, low RPM, standby, and maintenance ranks, reporting the volume as not found.

5. The method of claim 1, wherein moving a volume of the plurality of storage volumes between the plurality of ranks according to an access pattern of the volume includes:
  detecting an add volume command to add a new volume,
  determining a size of the new volume,
  determining if the new volume will fit on at least one normal rank, wherein if the volume will fit, creating the new volume on the at least one normal rank, otherwise:
    determining if any free ranks are available, and promoting a free rank to the at least one normal rank, otherwise:
      returning a system full error.

6. The method of claim 1, wherein moving a volume of the plurality of storage volumes between the plurality of ranks according to an access pattern of the volume includes executing a background process whereby:
  the volume is monitored to determine whether an elapsed time since the last access time has exceeded at least one of a plurality of predetermined values, wherein if the elapsed time has exceeded the at least one of a plurality of predetermined values:
    the volume is moved to a new rank of the plurality of ranks, the new rank selected based on the elapsed time.

7. The method of claim 6, wherein moving the volume to a new rank of the plurality of ranks includes determining at least one of:
  whether a source rank of the volume is in a read/write mode,
  whether the volume fits on at least one existing destination rank,
  whether the destination rank is in a read/write mode, and
  whether a free rank is available.

8. The method of claim 6, wherein if the elapsed time has not exceeded the at least one of a plurality of predetermined values:
  the volume is analyzed to determine if the volume fits on an existing rank of a same rank type, wherein if the volume fits on an existing rank of a same rank type, the volume is consolidated with a like volume on the existing rank.

9. A system for reducing the collective power consumption of a plurality of storage devices including a plurality of associated storage volumes, comprising:
  a controller in communication with the plurality of storage volumes, the controller adapted for:
    grouping the storage volumes by a last access time according to a plurality of ranks, the plurality of ranks corresponding to a level of power consumption based on device activity, including one of a normal, rebuilding, degraded, unloaded, low revolutions-per-minute (RPM), standby, and maintenance rank, and
    moving a volume of the plurality of storage volumes between the plurality of ranks according to an access pattern of the volume.

10. The system of claim 9, wherein the controller is further adapted for:
  detecting one of a read command and an update command,
  determining if the volume is on one of the normal rank and the rebuilding rank,
  performing one of reading the volume and updating the volume, and
  updating a volume last accessed timestamp.

11. The system of claim 9, wherein the controller is further adapted for:
  detecting one of a read command and an update command,
  determining if the volume is on the unloaded rank, wherein if the volume is on the unloaded rank, powering up at least one drive servo associated with the volume, and setting a to the normal rank,
  determining if the volume is on the low RPM rank, wherein if the volume is on the low RPM rank, spinning up at least one drive associated with the volume,
  determining if the volume is on the standby rank, wherein if the volume is on the standby rank, powering up the at least one drive associated with the volume,
  setting the rank to the normal rank,
  performing one of reading the volume and updating the volume, and
  updating a volume last accessed timestamp.

12. The system of claim 9, wherein the controller is further adapted for:
  detecting one of a read command and an update command,
  determining if the volume is on the maintenance rank, wherein if the volume is on the maintenance rank, reporting the volume as inaccessible, and
  determining if the volume is not on one of the normal, rebuilding, unloaded, low RPM, standby, and maintenance ranks, wherein if the volume is not on one of the normal, rebuilding, unloaded, low RPM, standby, and maintenance ranks, reporting the volume as not found.

13. The system of claim 8, wherein the controller is further adapted for:
  detecting an add volume command to add a new volume,
  determining a size of the new volume, determining if the new volume will fit on at least one normal rank, wherein if the volume will fit, creating the new volume on the at least one normal rank, otherwise:
  determining if any free ranks are available, and promoting a free rank to the at least one normal rank, otherwise:
  returning a system full error.

14. The system of claim 8, wherein the controller is further adapted for:
  monitoring the volume to determine whether an elapsed time since the last access time has exceeded at least one of a plurality of predetermined values, wherein if the elapsed time has exceeded the at least one of a plurality of predetermined values:
    moving the volume to a new rank of the plurality of ranks, the new rank selected based on the elapsed time.

15. The system of claim 9, wherein the controller is further adapted for determining at least one of:
  whether a source rank of the volume is in a read/write mode,
  whether the volume fits on at least one existing destination rank,
  whether the destination rank is in a read/write mode, and
  whether a free rank is available.

16. The system of claim 14, wherein the controller is further adapted for, if the elapsed time has not exceeded the at least one of a plurality of predetermined values:
  analyzing the volume to determine if the volume fits on an existing rank of a same rank type, wherein if the volume fits on an existing rank of a same rank type, the volume is consolidated with a like volume on the existing rank.

17. A computer program product for reducing the collective power consumption of a plurality of storage devices including a plurality of associated storage volumes, the computer program product comprising a non-transitory computer-readable storage medium having computer-readable program code portions stored therein and executed by a processor device, the computer-readable program code portions comprising:
  a first executable portion for grouping the storage volumes by a last access time according to a plurality of ranks, the plurality of ranks corresponding to a level of power consumption based on device activity, including one of a normal, rebuilding, degraded, unloaded low revolutions-per-minute RPM standby, and maintenance rank; and
  a second executable portion for moving a volume of the plurality of storage volumes between the plurality of ranks according to an access pattern of the volume.

18. The computer program product of claim 17, wherein the first executable portion for moving a volume of the plurality of storage volumes between the plurality of ranks according to an access pattern of the volume includes a fourth executable portion for:
  detecting one of a read command and an update command,
  determining if the volume is on one of the normal rank and the rebuilding rank,
  performing one of reading the volume and updating the volume, and
  updating a volume last accessed timestamp.

19. The computer program product of claim 17, wherein the second executable portion for moving a volume of the plurality of storage volumes between the plurality of ranks according to an access pattern of the volume includes a fourth executable portion for:
  detecting one of a read command and an update command,
  determining if the volume is on the unloaded rank, wherein if the volume is on the unloaded rank, powering up at least one drive servo associated with the volume, and setting a to the normal rank,
  determining if the volume is on the low RPM rank, wherein if the volume is on the low RPM rank, spinning up at least one drive associated with the volume,
  determining if the volume is on the standby rank, wherein if the volume is on the standby rank, powering up the at least one drive associated with the volume,
  setting the rank to the normal rank,
  performing one of reading the volume and updating the volume, and
  updating a volume last accessed timestamp.

20. The computer program product of claim 17, wherein the second executable portion for moving a volume of the plurality of storage volumes between the plurality of ranks according to an access pattern of the volume includes a fourth executable portion for:
  detecting one of a read command and an update command,
  determining if the volume is on the maintenance rank, wherein if the volume is on the maintenance rank, reporting the volume as inaccessible, and
  determining if the volume is not on one of the normal, rebuilding, unloaded, low RPM, standby, and maintenance ranks, wherein if the volume is not on one of the normal, rebuilding, unloaded, low RPM, standby, and maintenance ranks, reporting the volume as not found.

21. The computer program product of claim 17, wherein the second executable portion for moving a volume of the plurality of storage volumes between the plurality of ranks according to an access pattern of the volume includes a third executable portion for:
  detecting an add volume command to add a new volume,
  determining a size of the new volume,
  determining if the new volume will fit on at least one normal rank, wherein if the volume will fit, creating the new volume on the at least one normal rank, otherwise:
    determining if any free ranks are available, and promoting a free rank to the at least one normal rank, otherwise:
    returning a system full error.

22. The computer program product of claim 17, wherein the second executable portion for moving a volume of the plurality of storage volumes between the plurality of ranks according to an access pattern of the volume includes a third executable portion for executing a background process whereby:
  the volume is monitored to determine whether an elapsed time since the last access time has exceeded at least one of a plurality of predetermined values, wherein if the elapsed time has exceeded the at least one of a plurality of predetermined values:
    the volume is moved to a new rank of the plurality of ranks, the new rank selected based on the elapsed time.

* * * * *